United States Patent [19]
Fischer et al.

[11] Patent Number: 6,091,529
[45] Date of Patent: Jul. 18, 2000

[54] CHANNEL ALLOCATION METHOD IN CONNECTION WITH DATA TRANSMISSIONS IN THE OPTICAL FREQUENCY RANGE

[75] Inventors: Edgar Fischer, Müllheim Dorf; Bernhard Wandernoth, Kirchberg, both of Switzerland

[73] Assignee: Contraves Space AG, Zürich, Switzerland

[21] Appl. No.: 08/882,271

[22] Filed: Jun. 25, 1997

[30] Foreign Application Priority Data

Oct. 5, 1996 [CH] Switzerland .............................. 2416/96

[51] Int. Cl.[7] ................................................. H04J 14/02
[52] U.S. Cl. .................. 359/172; 455/12.1; 455/436; 342/352; 359/124; 359/125
[58] Field of Search ................... 359/124, 125, 359/172; 370/316, 326; 455/75, 76, 84, 86

[56] References Cited

U.S. PATENT DOCUMENTS

| | | | |
|---|---|---|---|
| 5,367,304 | 11/1994 | Jan et al. ................................. | 342/352 |
| 5,369,516 | 11/1994 | Uchida ..................................... | 359/125 |
| 5,594,940 | 1/1997 | Peterson et al. ....................... | 455/12.1 |
| 5,732,351 | 3/1998 | Olds et al. .............................. | 455/436 |

FOREIGN PATENT DOCUMENTS 2250394  6/1992  United Kingdom .

OTHER PUBLICATIONS

M. Guy et al., "Simultaneous Absolute Frequency Control of Laser Transmitters in Both 1.3 and 1.55 um Bands for Multiwavelength Communication Systems", Journal of Lightwave Technology, vol. 14, No. 6, p. 1136–1143, Jun. 1, 1996.

Dr. W. Koechner, Solid–State Laser Engineering, Fourth Edition, p. 256–259.

T. Saitoh et al., "Proposal of a Multiplex Optical Frequency Comb Generation System", IEEE Photonics Technology Letters, vol. 8, No. 2, p. 287–289, Feb. 1, 1996.

O.J. Koning et al., "Reference Frequency–Comb for Multi–Channel Stabilization by Mode–Locking of a Semiconductor Laser", Proceedings of the European Conference on Optical Communication, p. 539–542, Sep. 16, 1990.

*Primary Examiner*—Jason Chan
*Assistant Examiner*—Dalzid Singh
*Attorney, Agent, or Firm*—Browdy and Neimark

[57] ABSTRACT

The instant invention contains a method for establishing a channel grid for optical transmission channels, wherein an optical communication between arbitrary stations, but in particular satellite terminals, is made possible.

14 Claims, 2 Drawing Sheets

CHANNEL ALLOCATION METHOD IN CONNECTION WITH DATA TRANSMISSIONS IN THE OPTICAL FREQUENCY RANGE

FIELD OF THE INVENTION

The invention relates to a method for establishing a channel plan for optical transmission channels, wherein an optical communication between arbitrary stations, in particular satellite terminals, is made possible.

BACKGROUND OF THE INVENTION

A fixedly agreed upon grid of frequencies is used in radio technology for making the establishment of the connections easier and for making optimum use of the available transmission bandwidth. The transmission channels created by this have channel bandwidths which are matched to the type of modulation and the transmission bandwidth, and which in most cases still have a safety reserve for preventing interference by the neighboring channel because of imperfect filters, for example. The channels can be permanently used by only one transmitter and a plurality of changing receivers, or they can be flexibly assigned to different transmitters.

The known access methods for the multiple use of a transmission path, such as frequency and time multiplex methods, can also be found in optical communications technology.

Frequency multiplexing methods in particular can be implemented in the most diverse manner. There is the option, for example, to combine several optical frequency ranges or wavelengths on one transmission path in that the emissions of different transmitter on different wavelengths are separated by optical filters prior to their detection in different receiver channels.

Furthermore, the signal light to be detected can be conducted, together with the emission of an unmodulated, quasi monochromatic beam source, to a photo detector. Since optical input of a receiver is converted into electrical current in a photo detector and the electrical output generated by this is therefore proportional to the square of the optical input, an alternating current at the difference frequency of both optical waves is created when two optical frequencies are detected. It is therefore possible to employ the high selectivity of electrical filters, instead of expensive optical filters, for separating a desired signal.

Finally, the option is also provided of superimposing two optical waves of the same frequency in a photo detector, wherein the value of the photo current is determined as a function of the phase relation between the lightwaves.

Regarding detection sensitivity, this method represents one of the most efficient ones. However, the need for exactly agreed upon optical frequencies arises here, too, in order to make taking up and conducting the connection easier. Proposed solutions of this problem exist for so-called dense wavelength multiplex systems, which make use of sharp absorption points of defined molecules, which appear at lesser density in the optical frequency range (M. Guy et al., "Simultaneous Absolute Frequency Control of Laser Transmitters in Both 1.3 and 1.55 mum Bands for Multiwavelength Communications Systems", IEEE JLT, vol. 14, No. 6, June 1996, pp. 1136 to 1143).

It is furthermore described how a grid (or, plan) of optical reference frequencies can be created by the periodic transmission function of a Michelson interferometer. These can be used for setting the optical frequency of the laser employed in the transmission system. Depending on the laser type, such as a laser diode or laser-diode-pumped solid state lasers, the adjustment of a grid frequency can be performed by variation of the injection current or the temperature of the laser.

The complexity and the weight of the apparatus required for this process has a disadvantageous effect on the provision of such a frequency grid, in particular in connection with applications in space.

OBJECT AND SUMMARY OF THE INVENTION

It is therefore the object of the invention described in what follows to avoid these disadvantages connected with the prior art and to assure by means of a simple method of small technical outlay that the optical frequency grid is adhered to.

This object is attained in accordance with the invention in that characteristics of the transmitting and receiving units of the satellite terminals are stored during an implementation phase, and that these characteristics of the transmitting and receiving units of the satellite terminals are used for determining the corresponding channel girds during a respective utilization phase for the time-limited establishment of communications prior to establishing contact.

Because of their comparatively high output yield and their low weight, diode-pumped solid state lasers offer themselves for optical free space connections, for example miniature Nd:YAG ring lasers, whose optical frequency can be tuned by changes in their crystal temperature by 50 GHz and more (see W. Koechner, "Solid State Laser Engineering", Springer, Heidelberg, 1995). A change in the frequency of the stimulated resonator mode takes place because of the change of the crystal temperature and the resultant change in length. Finally a mode which adjoins the optical frequency will be stimulated, therefore reproducible discontinuities of the optical frequency occur with this tuning method.

In connection with the said Nd:YAG lasers the reproducibility of setting a defined emission frequency is primarily determined by temperature control of the laser crystal. Reproducibility within a frequency range ±300 MHz at an emission frequency of 281 THz is attained in commercially available devices. The use of the coherent technique in optical free space connections is very advantageous, the reason for this being that no narrow-band optical filters are required for keeping secondary light, which is normally present in free space, away from the detector in order to improve the signal-to-noise ratio. The high frequency selectivity of coherent detection is based solely on the interaction between the superimposed and received light in the photo detector.

Because the real photo detectors are operated close to the shot noise limit during superimposed reception, up to an output proportion of several percent of the superimposing light i.e. the local oscillator light, the background light has only a marginal effect on the signal-to-noise ratio of the detected signal. Because of the lack of narrow-band optical filters, the coherent transmission technique has the additional advantage of keeping the optical frequency used for transmission freely selectable within a wide range. It is merely necessary to assure that the optical center frequency of the signal light exactly matches the frequency of the superimposed light.

Further details, features and advantages of the invention ensue not only from the claims and the features which can be taken from them individually or in combination, but also from the following description of a preferred embodiment.

DETAILED DESCRIPTION OF THE PREFERRED EMBODIMENT

Figure 1:
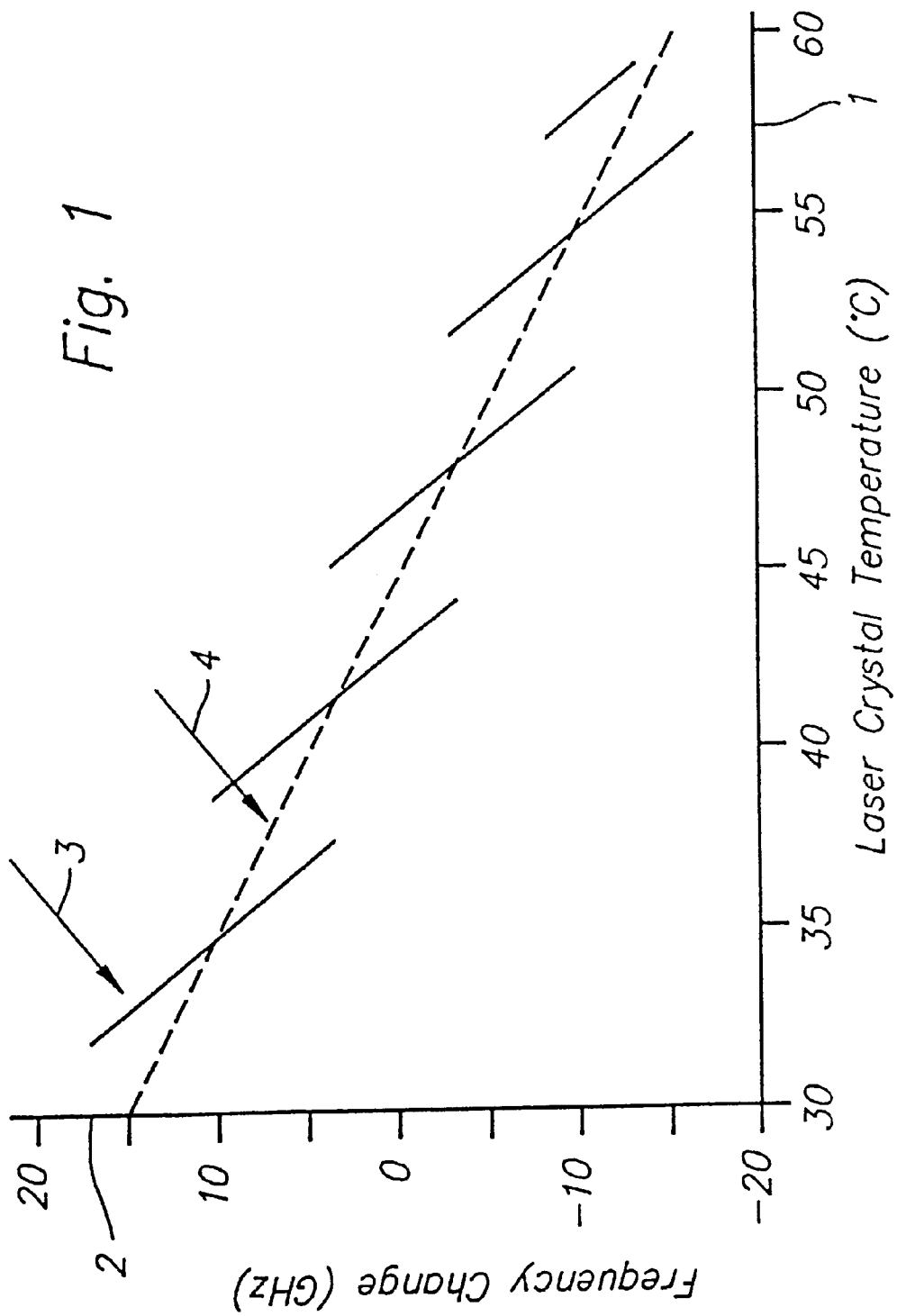
FIG. 1 represents a typical thermal tuning curve of a miniature Nd:YAG ring laser.

The typical thermal tuning curve of a miniature Nd:YAG ring laser is represented in FIG. 1, wherein a sheaf of solid lines 3 characterizes those areas in which a continuous change of the optical frequency 2, scaled in Gigahertz, takes place by means of a continuous change of the temperature 1, indicated in degrees Celsius, of the crystal of the ring laser. Areas exist between the solid area lines 3 in which no unequivocal oscillation of the laser is possible. In this exemplary embodiment the optical frequency of the laser changes by approximately 2.4 GHz/° C. within a continuously variably tunable area. A dashed line indicates the course of the mean optical frequency 4 when variably tuning through a larger area. In this case the mean change in the optical frequency is 1 GHz/° C.

A problem only exists in the different thermal tuning curves of two lasers of the same type, and the cause of this is that the crystal of the laser, which also contains the resonator, cannot be built with a precision at which a complete matching of the tuning curves could be expected. Accordingly, the light of the transmitting laser can have an optical frequency in which the laser generating the superimposed light cannot oscillate. This in turn means that the transmitting station requires information regarding a mutually usable optical frequency prior to making the connection.

Figure 2:
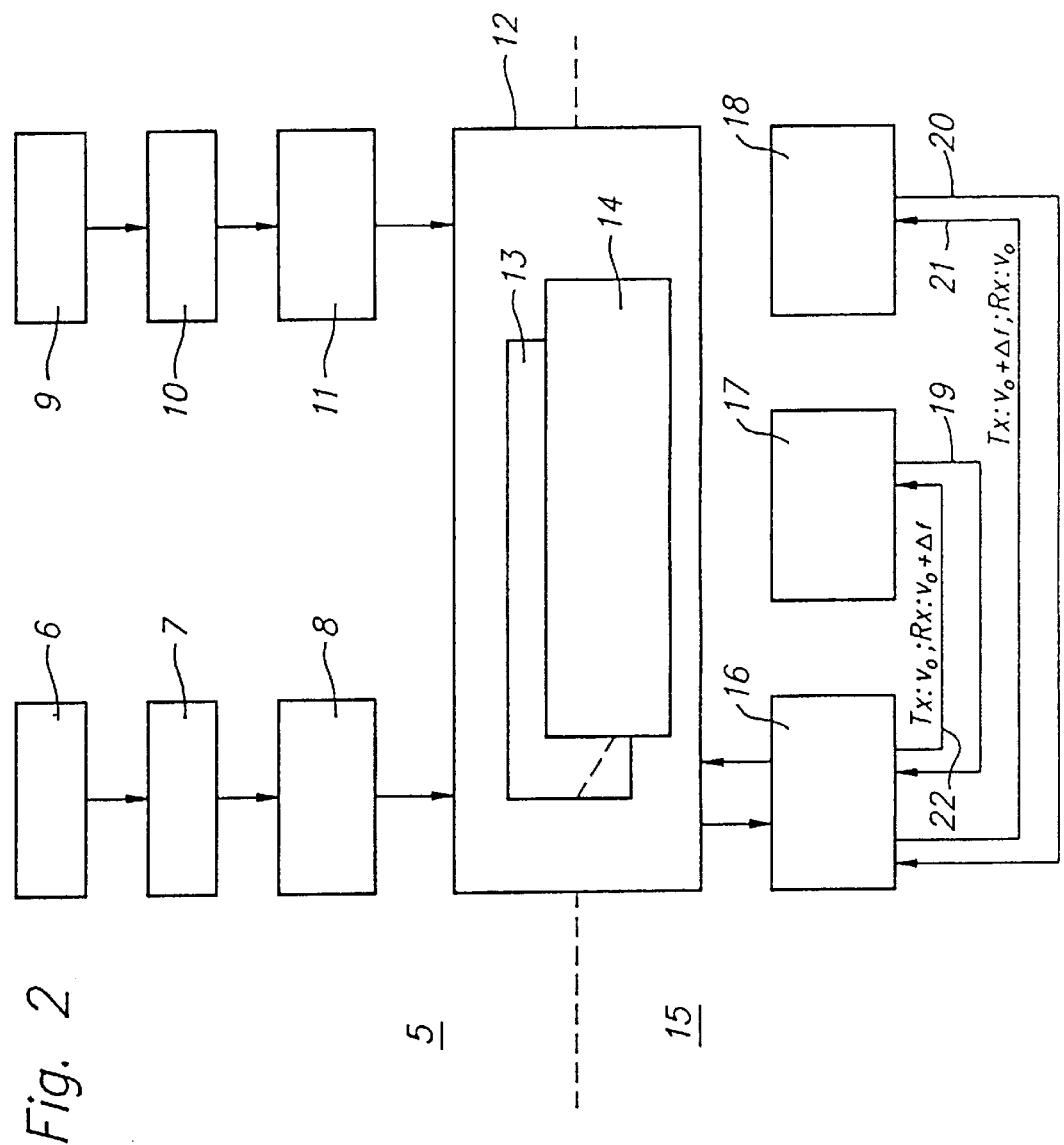
FIG. 2 is a block diagram of a frequency management concept for coherent communications in a satellite net.

By means of FIG. 2 it can be demonstrated how, during an implementation phase 5, this information regarding a transmitting laser 6 and a local oscillator laser 9 is stored in a common terminal data archive 12, and affects the cooperation of a first terminal 17 with a second (n-th) terminal 18 in a utilization phase 15.

First the transmitting laser 6 is provided with a first identification code 7 and the local oscillator laser 9 with a second identification code 10. Subsequently a determination of the respective variable tuning characteristics 8 and 11 in accordance with FIG. 1 is performed at both lasers, the transmitting laser 6 and the local oscillator laser 9. The data sets obtains from this are stored in a terminal data archive 12 in a first laser characteristic number archive 13 and a second laser characteristic number archive 14 for the individual lasers. At the start of the utilization phase 15, a network management unit 16 accesses the terminal data archive 12 in order to obtain the data required for the control of the first terminal 17 and the second terminal 18. On the basis of the variable tuning characteristics 8 and 11 downloaded from the archive 12, the network management unit 14 causes the setting of optical transmitting and receiving frequencies 21 and 22, furthermore, actualization sets 19 and 20 of the variable tuning characteristics 8 and 11 are made by the network management unit 16 during the operation of the first terminal 17 and the second terminal 18 and are written into the terminal data archive 12.

In a satellite network, the terminal data archive 12 and the network management unit 16 are located in a ground station, the commands (assignment of the optical transmitting and receiving frequencies) 21 and 22 and the interrogators 19 and 20 are issued via a radio channel (telecommand/telemetric) to the individual satellites.

Prior to establishing a time-limited connection between two arbitrary stations of a net, the appropriate laser archives 13 and 14 in the terminal data archive 12 are accessed by the network management unit 16 by means of the first identification code 7 and the second identification code 10 of the corresponding transmitting laser 6 or local oscillator laser 9, and the (actual) variable tuning characteristics 8 and 11 of the lasers are interrogated. Following this, a channel in the optical frequency range which can be used by both lasers, is determined. In an optical free space connection first the mutual spatial acquisition of both terminals 17 and 18 now takes place, this is followed by the optical acquisition of the optical frequency by controlling the local oscillator laser 9. The previous agreement to a fixed channel grid here means a considerable speed-up.

If the open loop control of the local oscillator laser 9 is too inexact, small deviations w.v.t. the optical carrier frequency of the optical frequency of the local oscillator laser 9 from that of the transmitting laser 6 generate an alternating current in the detector of a difference frequency which can be used as an input value for a controller. If the electrical bandwidth of the photo detector and the downstream components is exceeded by this difference frequency, the local oscillator laser 9 must be variably tuned during a search run until a detectable difference frequency is present.

Often the transmission paths in optical free space connections are used bidirectionally. Coherent transmission systems are distinguished in that background light up to an output proportion of several percent of the superimposing light has only a negligible effect on the signal-to-noise ratio of the detected signal. If in a bidirectional optical connection the same lens system is partially used for both paths, backscattering of a certain amount of its own transmission light into the receiver of the terminal must be accepted. But if the difference between the frequencies of transmitted and received light exceeds the bandwidth of the detector used in the receiver or that of downstream-connected filter, the effects of the backscattered transmitter light is also negligible. Although the backscattered transmitter light has an interaction with the local oscillator light, this signal is only registered as constant light because of the integrating effects of the photodetector.

A channel grid should therefore be established wherein the mutual distance between two adjoining channels exceeds the detection bandwidth of the optical receiver.

It can be noted as a further advantage of the method in accordance with the invention that each terminal of the same type can establish a connection with every other one, in contrast to the prior art, where it is necessary in existing systems to match a respective transmitting laser and a local oscillator laser to each other without there being the option of later adaptations.

What is claimed is:

1. A method for establishing an optical-transmission channel grid including an optical communication between arbitrary stations comprising satellite terminals (17, 18), the method comprising:

storing characteristics of transmitting and receiving units of the satellite terminals (17,18) during an implementation phase (5), in a data terminal archive (12) of the satellite terminals;

using these characteristics of the transmitting and receiving units of the satellite terminals (17, 18) for determining corresponding channel grids during a respective utilization phase (15) for a time-limited establishment of communications prior to establishing contact; and storing a first variable tuning characteristic (8) of a transmitting laser (6) and a second variable tuning characteristic (11) of a local oscillator laser (9) as characteristics of the transmitting and receiving units of the satellite terminals (17, 18);

wherein the transmitting and receiving units include at least one said transmitting laser (6) and one said local oscillator laser (9).

2. The method in accordance with claim 1, characterized in that a network management unit (16), which can communicate with several satellite terminals (17, 18), is provided for the utilization phase (15).

3. The method in accordance with claim 2, characterized in that a first identification code (7) is provided for the transmitting laser (6), and a second identification code (10) for the local oscillator laser (9).

4. The method in accordance with claim 3, characterized in that the network management unit (16) is embodied as a ground station, which communicated by radio contact with the satellite terminals (17, 18).

5. The method in accordance with claim 2, characterized in that the network management unit (16) has means which, by means of a first interrogation (21) and a second interrogation (22), cause the stored characteristics of the transmitting and receiving units of the satellite terminals (17, 18) to be written over with actual data by a first actualization set (19) and a second actualization set (20).

6. The method in accordance with claim 5, characterized in that the network management unit (16) is embodied as a ground station, which communicated by radio contact with the satellite terminals (17, 18).

7. The method in accordance with claim 6, characterized in that the terminal archive (12) has a first laser characteristics archive (13) for the storage of the characteristics of the transmitting laser (6), and a second laser characteristics archive (14) for the storage of the characteristics of the local oscillator laser (9).

8. The method in accordance with claim 2, characterized in that the network management unit (16) is embodied as a ground station, which communicates by radio contact with the satellite terminals (17, 18).

9. The method in accordance with claim 2, characterized in that the terminal archive (12) has a first laser characteristics archive (13) for the storage of the characteristics of the transmitting laser (6), and a second laser characteristics archive (14) for the storage of the characteristics of the local oscillator laser (9).

10. The method in accordance with claim 2, characterized in that a fixed channel grid is agreed upon between the transmitting and receiving units of the satellite terminals (17, 18), which includes the relevant characteristics.

11. The method in accordance with claim 1, characterized in that a first identification code (7) is provided for the transmitting laser (6), and a second identification code (10) for the local oscillator (9).

12. The method in accordance with claim 1, characterized in that a network management unit (16) has means which, by means of a first interrogation (21) and a second interrogation (22), cause the stored characteristics of the transmitting and receiving units of the satellite units (17, 18), to be written over with actual data by a first actualization set (19) and a second actualization set (20).

13. The method in accordance with claim 1, characterized in that a fixed channel grid is agreed upon between the transmitting and receiving units of the satellite terminals (17, 18), which includes the relevant characteristics.

14. The method in accordance with claim 1, wherein the optical-transmission channel grid comprises an optical-transmission channel plan.

* * * * *